June 9, 1936.　　　　J. H. REED　　　　2,043,305
APPARATUS FOR MAKING SHOES
Filed Jan. 6, 1934　　　8 Sheets-Sheet 7

Inventor:
James H. Reed,
By Macleod, Calver, Copeland & Dike,
Attorneys.

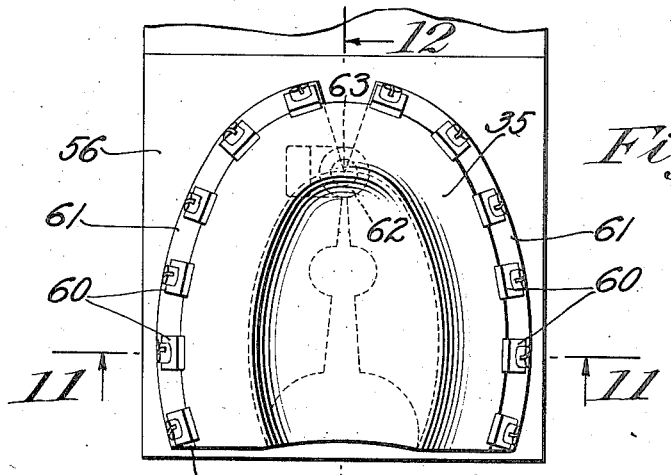
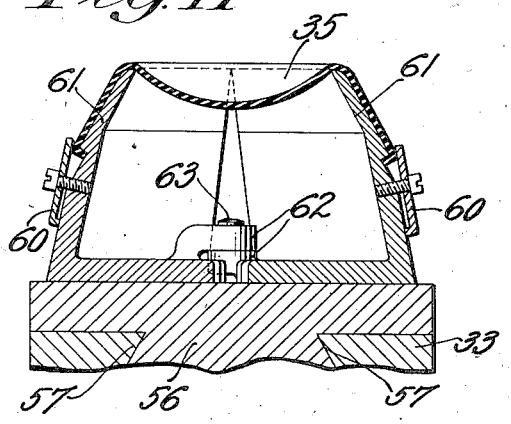
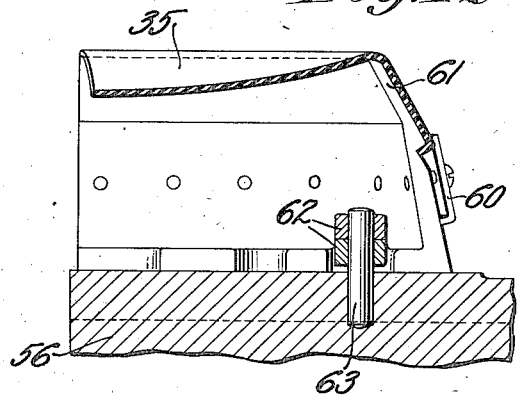
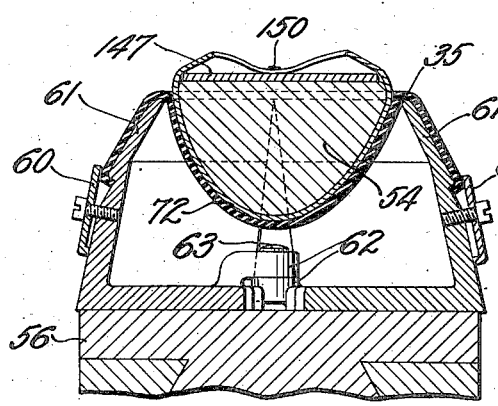
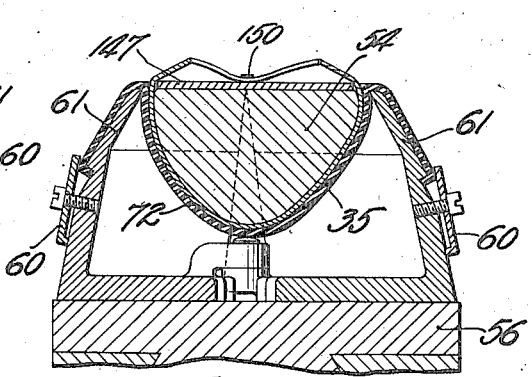

Patented June 9, 1936

2,043,305

UNITED STATES PATENT OFFICE 2,043,305

APPARATUS FOR MAKING SHOES

James H. Reed, Marblehead, Mass.; Charles H. Reed administrator of said James H. Reed, deceased Application January 6, 1934, Serial No. 705,576

4 Claims. (Cl. 12—12)

This invention relates to the manufacture of cemented shoes, sometimes known as "Ago" or "Compo" shoes, in which the insole, upper and outsole are secured together wholly by a suitable cement without the use of stitching, tacks or other fasteners.

In the manufacture of such shoes, the steps prior to final bottoming have heretofore presented certain difficulties resulting in more or less defective shoes. In accordance with the usual procedure heretofore followed, the upper and insole are assembled on the last, the upper being pulled over in the usual way, the shoe lasted either by hand or by the use of hand method lasting machines, and the edges of the upper (to which cement has been applied) secured to the insole by temporary fasteners until the cement, which constitutes the permanent connection between the insole and upper, has set. The temporary fasteners usually comprise clamping strips which are secured over the edges of the lasted upper by means of tacks or staples. This lasting of the shoe and application of the temporary fasteners is a slow and laborious operation requiring highly skilled labor. After the setting of the cement, the temporary fasteners must be removed before the outsole is applied. Also, the edge of the upper, being somewhat bunched, must be smoothed down, and, due to its wrinkled condition and the lack of adequate pressure tending to cause it to lie flat and smooth on the insole, the setting of the cement is uneven, resulting in more or less defective work. The uneven setting of the cement is further aggravated by the time consumed in the lasting of the shoe and the application of the temporary fasteners.

The present invention has for its general objects to overcome the above difficulties and provide a method by which shoes of this character can be easily, quickly and satisfactorily lasted, and in accordance with which the edges of the upper are tightly lasted over and smoothed down upon the insole and held under adequate pressure, until the cement has set, without the use of temporary fasteners. The invention also includes the provision of an improved mechanism of the bed laster type whereby the above method can be conveniently practiced by simple manipulations requiring relatively little skill.

The more particular objects of the invention, together with the preferred mode of carrying it into effect, will best be understood from the following description of the construction and operation of one form of apparatus in and by which it can be embodied and practiced, reference being had to the accompanying drawings. It will be understood, however, that the particular constructions and operations shown and described have been chosen for purposes of exemplification merely, and that the invention, as defined by the claims hereunto appended, may be otherwise embodied and practiced without departure from its spirit and scope.

Figure 4:
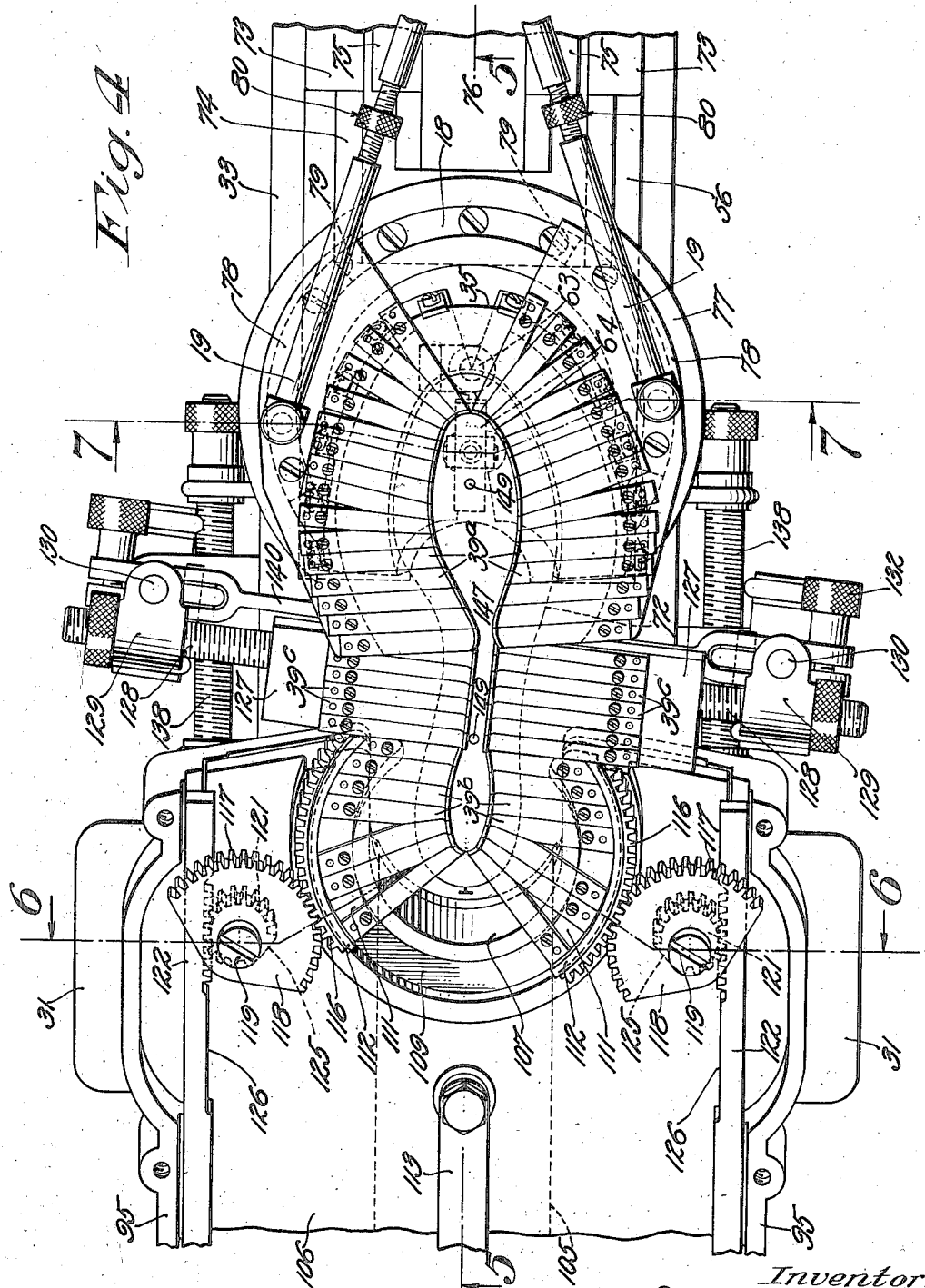
Fig. 4 is an enlarged plan view of certain of the parts shown in Fig. 1, illustrating the positions of the parts after the lasting operation and during the setting of the cement.
Figure 5:
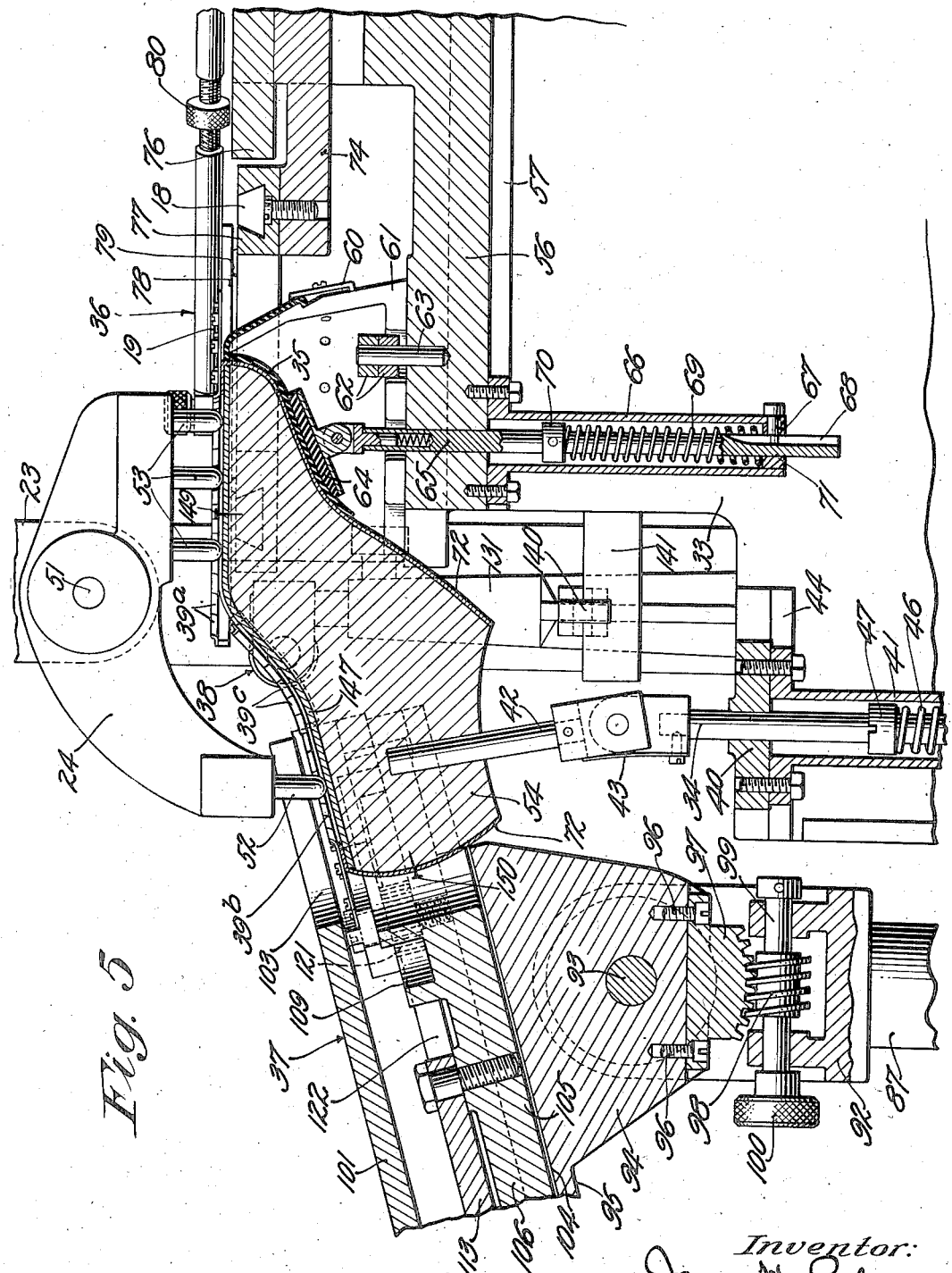
Figure 6:
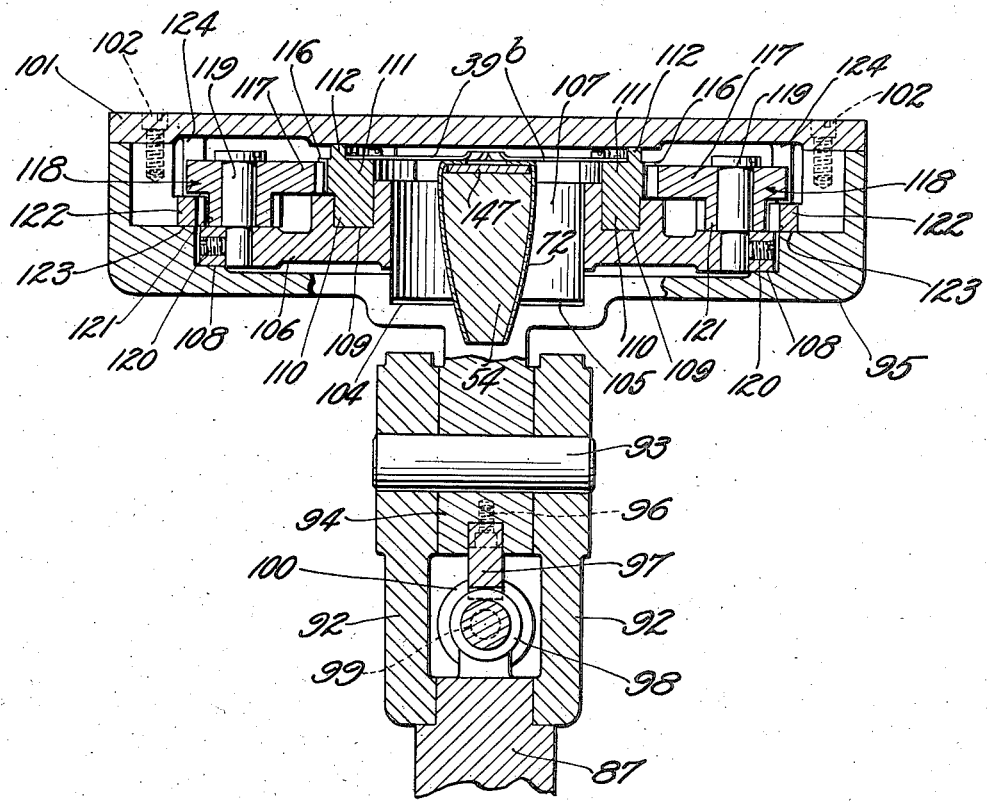
Figure 7:
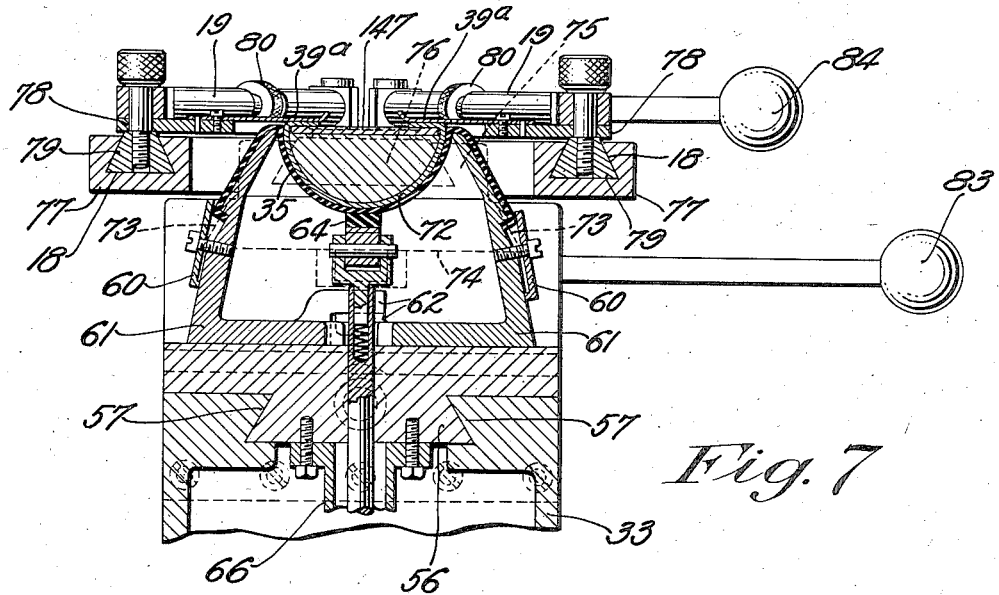

Figs. 5, 6 and 7 are sections taken substantially on the lines 5—5, 6—6, and 7—7, respectively, Fig. 4.

Figure 8:
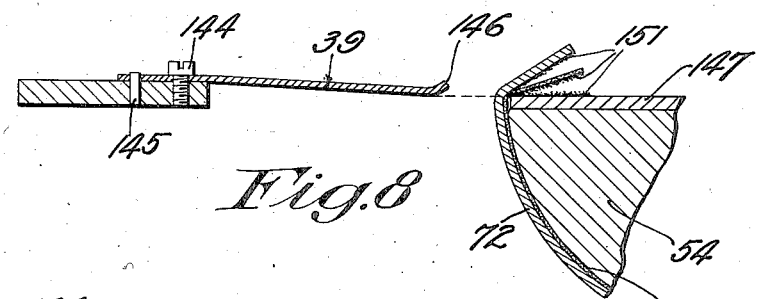
Figure 9:
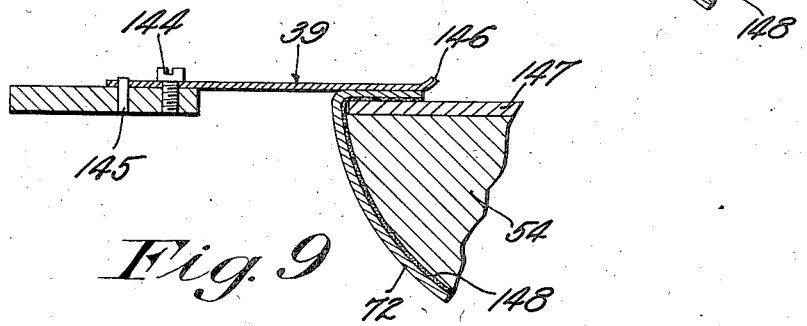

Figs. 8 and 9 are fragmentary views illustrating the operation of the wipers.

Fig. 10 is a plan view of the forepart or toe support.

Figs. 11 and 12 are sections taken substantially on the lines 11—11 and 12—12, respectively, Fig. 10.

Figs. 13 and 14 are views similar to Fig. 11 showing subsequent steps in the operation.

Figure 2:
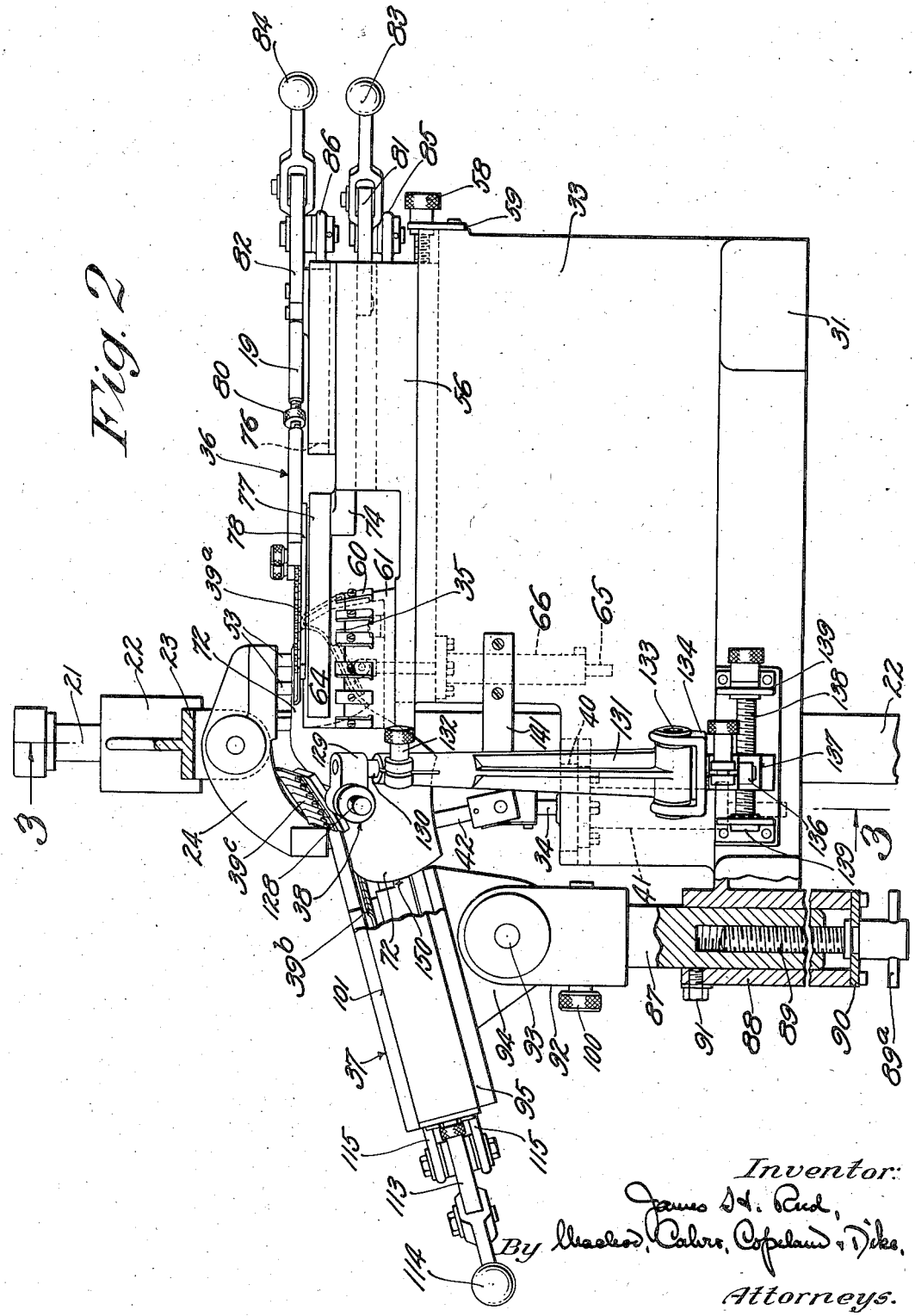
Fig. 2 is a side elevation, partly broken away.
Figure 3:
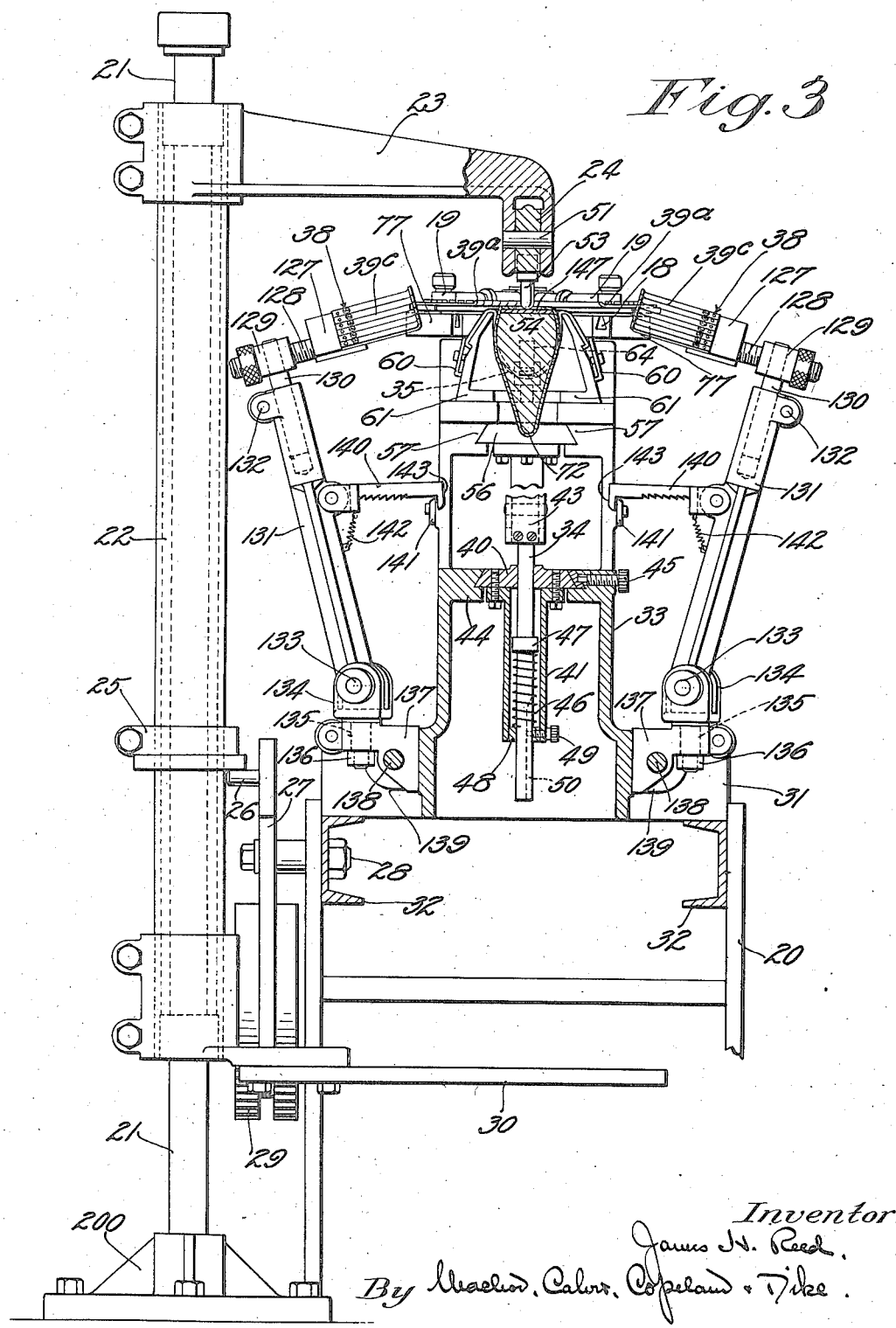
Fig. 3 is a vertical section taken substantially on the line 3—3, Fig. 2.

Referring to Fig. 3, the apparatus as a whole comprises a bench 20 adapted to support the lasting unit, of which a plurality, adapted for interchangeable or successive use, may be provided. Rising from a suitable base 200 beside the bench 20 is an upright 21 on which is guided for vertical movement a tubular slide 22 provided at its upper end with an arm 23 carrying a presser 24 (see also Figs. 2 and 5). The slide 22 is provided with a collar 25 which is engaged by a stud 26 on the lever 27 pivoted at 28 to the bench 20 and carrying a counterweight 29. The slide 22 is normally held elevated by the counterweight 29, acting through the lever 27, stud 26 and collar 25, but can be depressed at will by a treadle 30 carried at its lower end.

Each lasting unit comprises a base 31, adapted to be supported on rails 32 constituting parts of the bench 20, and from which rises a frame, designated by the numeral 33, suitably designed to afford the necessary supports, bearings and guides for the several instrumentalities. These instrumentalities include a last support 34 (Figs. 3 and 5) a forepart or toe support 35 (Figs. 5, 7 and 10 to 14), end wiper mechanisms including a forepart wiper mechanism 36 (Fig. 1) and a heel wiper mechanism 37, and side wiper mechanism 38. The several wiper mechanisms include a plurality of independently yielding spring wiper fingers 39 (Fig. 1) of such number and arrangement as, when moved into operative position, collectively to engage substantially the complete margin of the upper of the shoe throughout the entire outline of said shoe, as shown in Fig. 4, wherein the forepart wiper fingers are designated 39a, the heel wiper fingers 39b, and the side wiper fingers 39c.

The work support 34 comprises an upright post guided for vertical movement in a slide 40 and in a tubular barrel 41 bolted thereto and depending therefrom, said post having pivoted to its upper end a last jack pin 42 (Fig. 5) normally urged toward the forepart wiper mechanism 36 by a spring 43. The slide 40 is mounted in a guideway 44, formed in the frame 33, and may be adjusted therein forwardly or rearwardly to vary the position of the work support, being clamped in adjusted position by a set screw 45 (Fig. 3). The work support is normally urged upwardly by a spring 46 surrounding the post 34 and interposed between a collar 47 on the latter and the lower end 48 of the barrel 41, said post being guided and held against turning by a stud 49 carried by said barrel and engaging a groove 50 in the post.

The spring 46 tends normally to hold the work support in an elevated position from which it may be depressed against the tension of the spring by the presser 24. The latter, as shown in Figs. 2, 3 and 5, comprises a head pivoted at 51 to the end of the arm 23 and provided with studs 52 and 53 adapted respectively to engage the heel and forepart of the bottom of the shoe on a last 54 suitably jacked on the pin 42. The pivotal mounting of the presser head 24 permits the studs 52 and 53 to seat properly upon said shoe irrespective of the shape and position of the latter.

The toe support 35 and the forepart wiper mechanism 36 are carried by a slide 56 (Figs. 2, 4, 7 and 11) guided in longitudinally disposed ways 57 in the frame 33, said slide being movable in said ways to adjust the longitudinal position of the parts carried thereby, in accordance with the length of the shoe being operated upon, by means of an adjusting screw 58 in threaded engagement with said slide and journalled in but held against longitudinal movement by a plate 59 (Figs. 1 and 2) secured to the frame 33.

The toe support 35 (see particularly Figs. 5, 7, and 10 to 14) comprises a strip of flexible and elastic material, preferably rubber, secured at its edges, as by clips 60, to a pair of hollow supporting members 61 having ears 62 pivoted to each other and to the slide 56 by a pin 63. The flexible support 35 is itself supported intermediate its edges by a centrally disposed toe pad 64 (Fig. 5) pivotally mounted on the upper end of a post 65 guided for vertical movement in the slide 56 and in a barrel 66 bolted to said slide and depending therefrom, said post being held against turning by a stud 67 carried by the barrel 66 and engaging a groove 68 in the post, and being normally urged upwardly by a spring 69 interposed between a collar 70 on the post and the head 71 of the barrel. The arrangement is such that, when the last 54 is depressed by the presser 24, the head 64 will first exert its pressure through the support 35 on the median portion of the toe part of an upper 72 on said last, thereby holding said upper against lateral movement, and as the last is forced downwardly into the support, through the position shown in Fig. 13 into that shown in Fig. 14, the tension of the strip 35 upon the members 61 will cause the latter to swing inwardly about their pivot 63, thereby tending to hold the marginal portion of the upper in close engagement with the last and wipe the same over the inwardly curved side portions adjacent the bottom edge of the latter.

Referring to Figs. 1, 2, 4, 5, and 7, the slide 56 is provided with longitudinal ways 73 in which is guided a slide 74. The latter slide in turn is provided with longitudinal ways 75 in which is guided a second slide 76. Secured to the forward end of the slide 74 is an arcuate guideway 77 having an undercut arcuate groove 18 to receive dovetailed arcuate slides 79 (Figs. 4, 5 and 7) secured to the forepart end wiper members 78 which constitute the operative parts of the forepart wiper mechanism 36, and by which the spring wiper fingers 39a of that mechanism are carried. The wiper members 78 are connected with the slide 76 by separate links 19 which are independently adjustable in length to vary the initial relative positions of the wiper members 78 in accordance with the swing of the last and to adapt the mechanism to right and left shoes. To this end, in the construction shown, each link 19 comprises two end sections connected by an intermediate section 80 having right and left thread screw connections with the adjacent sections, respectively.

The slides 74 and 76 are conneected by links 81 and 82, respectively (Fig. 2) with hand levers 83 and 84 (see also Fig. 1) pivoted to ears 85 and 86 projecting from the slides 56 and 74, respectively. By this construction the lever 83 may first be operated to advance the wiper elements 78 as a unit, with the slide 74, toward the shoe until the wiper fingers 39a at the center of the series have moved longitudinally over the extreme toe portion of the upper 72, after which the lever 84 may be operated to move the slide 76 and swing the wiper members 78 toward one another transversely of the shoe, thereby causing the wiper fingers 39a, which are adapted collectively to engage substantially the complete margin of the upper of the forepart of the shoe from the extreme forward end to the shank to move inwardly and wipe in said margin at the sides.

The forepart lasting mechanism above described, and which is carried by the slide 56 and includes the slides 74 and 76 and wiper members 78, is mounted for adjustment and operation in a single, preferably horizontal, direction while the heel wiper mechanism (generally indicated at 37 in Figs. 1 and 2) is mounted for angular and vertical adjustment with respect to the forepart wiper mechanism in accordance with the longitudinal contour of the bottom of the shoe being operated upon, and particularly the angular relationship of the forepart and heel part thereof.

Referring to Fig. 2, said heel wiper mechanism is supported by an upright or standard 87 vertically adjustable, in a tubular guide 88 formed in the base 31, by means of a screw 89 journalled in a plate 90 secured to the lower end of said guide, and is held in adjusted position by means of a set screw 91. The upright 87 is provided with a bifurcated head 92 (see also Figs. 5 and 6) between the arms of which is pivoted at 93 a depending flange or ear 94 on a second head 95. Secured to the lower end of the ear 94, as by screws 96, is a segmental worm gear 97 which meshes with a worm 98 on a shaft 99 journalled in the head 92 and provided with a hand wheel 100. It will be seen that by operating the hand wheel 100 the angular position of the head 95 may be adjusted, while by operating the screw 89, as by means of a handle 89a thereon, its vertical position can likewise be adjusted. As shown most clearly in Fig. 6, the head 95 is formed hollow to constitute a casing for the heel end wiper mechanism and is partly closed at its upper side by a cover plate 101 (omitted in Figs. 1 and 4) secured thereto by screws 102 and cut away, as shown at 103 in Fig. 5, to permit the presser stud 52 to engage the rear end of the shoe. The head or casing 95 is formed in its bottom with a longitudinal guideway 104 (Fig. 6) to receive a rib 105 (see also Fig. 4) on the bottom of the slide 106, said rib and slide being cut out at 107 to provide clearance for the rear end of the shoe. The slide 106 is guided at its outer edges on ways 108 formed on the bottom of the head or casing 95 and is itself formed with an arcuate way 109 to receive depending flanges 110 on heel end wiper members 111 formed with upstanding ribs 112 guided on the under surface of the cover plate 101, said wiper members carrying the spring wiper fingers 39b which are adapted collectively to engage substantially the complete margin of the upper of the heel portion of the shoe from the extreme rear end thereof substantially to the shank. The slide 106 is connected by a link 113 (Figs. 1 and 4) with a hand lever 114 pivoted to an ear or bracket 115 on the head 95. The wiper members 111 are provided with segmental racks 116 meshing with segmental portions 117 of pinions 118 rotatably mounted on studs 119 secured, as by set screws 120 (Fig. 6), in the slide 106. The pinions 118 have formed thereon or secured thereto co-axial segmental portions 121 which mesh with fixed racks 122 seated on shoulders 123 in the casing 95 and held in position on said shoulders by depending lugs 124 on the cover plate 101. The pinion portions 121 are formed with flattened faces 125 (Fig. 4) which, when the parts are in the position shown in Fig. 1, engage flattened surfaces 126 on the rack bar 122.

Figure 1:
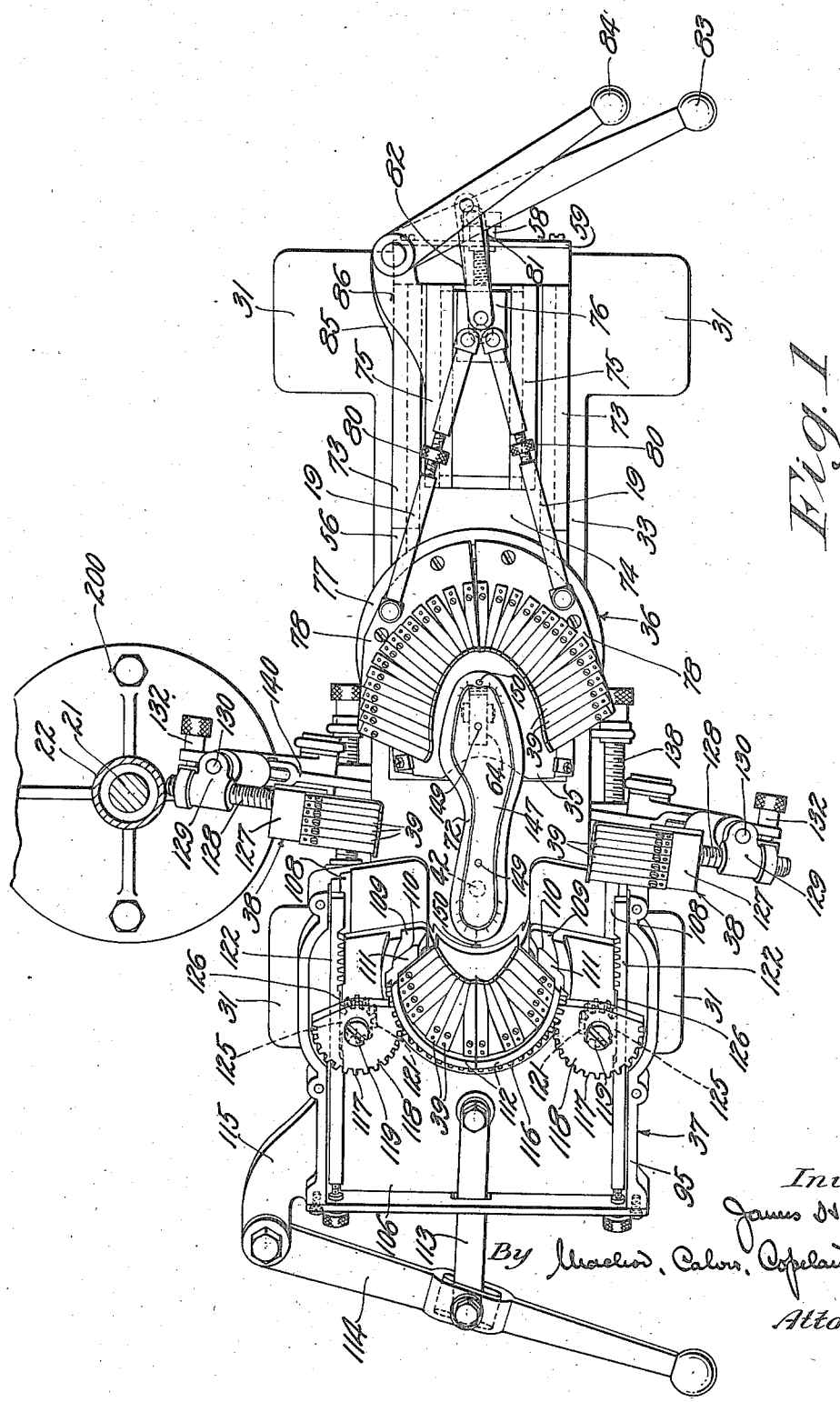
Fig. 1 is a plan view of the machine, with the presser omitted, showing the lasting instrumentalities in retracted position prior to the lasting operation.

It will be seen that by operation of the hand lever 114 the slide 106 may be moved inwardly from the position shown in Fig. 1 to that shown in Fig. 4. During the first part of this movement, engagement of the faces 125 with the surfaces 126 locks the pinions 118 against rotation on their studs 119, so that the wiper members 111 are moved as a unit without movement relative to each other until the wiper fingers 39b at the center of the series pass over the extreme rear end of the upper 72. Thereafter, engagement of the toothed pinion portions 121 with the toothed portions of the racks 122 causes the pinions 118 to be rotated and, acting through the arcuate racks 116, swing the wiper members 111 toward one another transversely of the shoe to cause the wiper fingers 39b to last the upper along the sides of the heel portion of the shoe.

Referring particularly to Figs. 1 to 4, the side wipers 38 comprise side wiper members 127 carrying the side spring wiper fingers 39c and having shanks 128 in threaded engagement with heads 129, whereby the positions of said wiper members, and their range of movement laterally of the shoe, may be set in accordance with the requirements. The heads 129 have shanks 130 received in the split, socketed upper ends of the arms 131, said shanks being clamped within said socketed ends by clamp screws 132. By loosening the clamp screws 132 the vertical position of the side wiper members 127 may be adjusted in accordance with the requirements. At their lower ends the arms 132 are pivoted at 133 between the arms of bifurcated heads 134 having shanks 135 secured, as by nuts 136, in slides 137. By loosening the nuts 136 the shanks 135 can be turned in the slides 137 to vary the angular positions of the side wiper members 127 in accordance with the requirements. The slides 137 are in threaded engagement with adjusting screws 138 journalled in brackets 139 secured to the base 31. By turning the screws 138 the slides 137 can be moved longitudinally of the margin to adjust the position of the side wiper members 127 longitudinally of the shoe. Pivoted to the arms 131 are latches 140 having serrated under surfaces urged into engagement with keepers 141 on the frame 33 by springs 142, said latches having at their ends fingers 143 to engage said keepers and limit the outward movement of the levers 131.

The several spring wiper fingers 39a, 39b, and 39c referred to generally in Figs. 1, 8 and 9 by the numeral 39 are secured to their respective wiper elements by screws 144, and each is held in its proper angular position by a stud 145. Each of said wiper fingers is composed of resilient material, preferably spring steel, and is formed with an upwardly curved free end 146.

It will be observed that the end wipers are all guided for movement substantially in single planes and that the side wipers, by reason of the length of the arms 131, also move substantially in single planes when in engagement with the upper, the vertical component of their lasting movement being very small. In operating the machine, the parts are so adjusted, and the last so depressed by the presser 24, as to bring the bottom of the shoe, and particularly the bottom face of the insole 147, approximately co-incident with the planes of lasting operation of the several wiper fingers in the regions of their operation, respectively. This operation is illustrated in Figs. 8 and 9 wherein it will be seen that, as each wiper finger 39 is moved inwardly over the edge of the upper to last the same, its curved end 146 will engage the upper and deflect the finger slightly out of its normal position, said finger by its resilience exerting a substantial pressure on the upper, so as to cause it to stretch the upper and press the same firmly against the outsole.

The method of lasting shoes by means of the apparatus above described is as follows:

The upper 72, including the usual lining 148 (Figs. 8 and 9) and the insole 147 are assembled on the last 54, said insole being secured to the last by temporary tacks 149 (Fig. 1) and the upper being pulled over and secured by temporary tacks 150 in the usual manner. The last is placed on the jack pin 42, and the various adjustments above referred to made in accordance with the size and shape of the shoe. The presser 24 is then depressed by means of the treadle 30 to bring the several portions of the bottom of the shoe into approximately the planes of operation of the several wiper fingers as determined by the adjustments of the several wiper mechanisms and work support. The parts are then substantially in the positions shown in Figs. 1 to 3 and 8. Cement, indicated at 151 in Fig. 8, is then applied to the edges of the upper, including the lining, or to the insole, or to both, in position to secure the edges of the upper to the insole. The several hand levers 83, 84 and 114 are then operated in the manner above described, and the arms 131 swung inwardly, thereby bringing the several wiper fingers into the positions shown in Figs. 4 to 7 and 9, wiping the edges of the upper over the edges of the insole, and lasting the shoe. By virtue of the arrangement of the parts and the means for operating them, the spring fingers collectively engage substantially the complete margin of the upper, wiping the same over the insole smoothly and evenly, the complete operation being performed in a very few seconds, before the cement has had an opportunity to set, and without the exercise of any considerable amount of skill or care. The operation of the wipers as above described exerts a considerable pressure upon the edges of the upper, pressing the same against the insole, but since the direction in which this pressure is exerted is substantially perpendicular to the direction of movement of the wipers into the position shown in Fig. 4, said wipers are maintained in this position until positively withdrawn by further operation of the operating levers. In the case of the side wipers, such retention is assisted by the latches 140. The pressure on the treadle 30 is then released, thereby permitting the work support spring 46 to increase the pressure between the wipers and upper. The parts are then left in this position to hold the edges of the upper under pressure until the cement has set. If desired, during the setting of the cement the lasting unit can be replaced by another and the operations repeated. Under the relatively high pressure exerted, however, the setting of the cement takes place in a very short interval of time, so that ordinarily no change of units will be required during a run of shoes of the same size and style. The pressure exerted during the setting of the cement also causes the latter to set evenly, so as to secure the upper to the insole in a reliable and satisfactory manner, and also prevents the formation of any objectionable folds or wrinkles requiring subsequent smoothing. After the cement has set, the presser is again depressed to relieve the pressure of the last against the wipers, the latter are returned to their original positions, and the lasted shoe removed. When so removed the shoe is ready for bottoming without the removal of any temporary lasting tacks or other fasteners and without any further operations upon the upper.

I claim:

1. In a bed lasting machine, end lasting mechanism comprising a slide, operating means therefor, a pair of wiper members mounted for swinging movement on said slide, rack segments carried by said members, pinions on said slide and engaging said segments, and fixed racks cooperating with said pinions, said racks and pinions having interengaging portions for holding said pinions against rotation during a portion of the movement of said side.

2. In a bed lasting machine, a vertically yielding last support, a flexible support for the forepart of the last, and pivoted members by which the ends of said flexible support are carried arranged to permit said ends to swing inwardly about the edge of the last and a presser adapted to depress a last on said support to move said members and swing the ends of said flexible support inwardly about the edge of the last.

3. In a lasting machine, in combination, a resilient support for a last, means for moving the last against the action of said resilient support, and means operative in response to said movement of the last for pressing an upper on the last into close engagement with the sides of the last adjacent the bottom thereof.

4. In a lasting machine, a vertically yielding last support, a flexible support for the forepart of the last, and pivoted members by which the ends of said flexible support are carried arranged to permit said ends to swing inwardly about the edge of the last, a presser adapted to depress a last on said support to move said members and swing the ends of said flexible support inwardly about the edge of the last, and wiper members movable inwardly over the bottom of the last.

JAMES H. REED.